Oct. 30, 1956 A. G. GOLDBERG Re. 24,233

AUTOMATIC SERVING TRAY

Original Filed March 22, 1952 2 Sheets-Sheet 1

Inventor
Arthur G. Goldberg
by Robert, Cushman & Grover
Att'ys.

Oct. 30, 1956 A. G. GOLDBERG Re. 24,233

AUTOMATIC SERVING TRAY

Original Filed March 22, 1952 2 Sheets-Sheet 2

Inventor
Arthur G. Goldberg
by Roberts, Cushman & Grover
Att'ys.

United States Patent Office

Re. 24,233
Reissued Oct. 30, 1956

24,233

AUTOMATIC SERVING TRAY

Arthur G. Goldberg, Newton Centre, Mass., assignor to Standard Box Co., Chelsea, Mass., a corporation of Massachusetts Original No. 2,679,971, dated June 1, 1954, Serial No. 277,981, March 22, 1952. Application for reissue May 7, 1956, Serial No. 583,348

14 Claims. (Cl. 229—28)

Matter enclosed in heavy brackets [ ] appears in the original patent but forms no part of this reissue specification; matter printed in italics indicates the additions made by reissue.

This invention relates to a tray and more especially to serving trays for use in carrying food and beverages from a roadside stand or restaurant to an automobile waiting at the curb or parked near the stand and for use in the automobile, conveniently to hold the food and beverage while it is being consumed.

The principal object of this invention is to provide a tray for supporting one or more cups of beverage and one or more sandwiches, rolls or other edibles in such a way as to minimize danger of slopping or spilling the beverage and/or loss of the food. A further object is to provide a tray made of paperboard or other inexpensive sheet material cheap enough to be expendable and yet of sufficient rigidity and stiffness to withstand rough handling and to resist buckling when held at one edge or corner or placed on an uneven surface even when loaded with beverage and food. A still further object is to provide a tray which is so constructed as to be initially collapsed so that there will be little danger of damage in shipment and so that it will occupy a minimum storage space prior to use. A further object is to provide an initially collapsed tray which may be set up with a minimum manipulation and when once set up is substantially non-collapsible. Another object is to provide a tray which is compartmentalized for reception of beverage in one compartment and food in another, that will accommodate beverage containers of different size and wherein the food compartment may be increased or decreased independently of and without affecting the beverage compartment. Still further objects are to provide a blank for making the aforesaid tray in sheet form so that it may be dinked out of a continuous web hence economizing in manufacture.

As herein illustrated the erected tray has a bottom and side and end walls rising therefrom. Intermediate one pair of walls there is situated a partition wall which runs parallel thereto and divides the tray into two compartments. A panel spans one of the compartments and its edges are made fast to the partition wall and to one of the walls parallel thereto. The panel has in it one or more openings which affords access through the panel to the compartment space therebelow, the opening being of sufficient size to receive the bottom part of a beverage cup or container inserted through the opening to rest on the bottom. Frictional members are arranged about the opening for engagement with the wall of the cup inserted through the opening to hold it in place. The tray has a corner construction such that after the walls are raised to their erect positions the corners are self-locking, that is substantially non-collapsible. As further illustrated the partition wall is hingeably made fast at its lower edge to the bottom and has at its ends cam edges which overlie the upper edges of the end walls of the tray when it is collapsed so that when the end walls are raised to vertical positions the partition wall is also raised to its vertical position.

The invention will now be described in greater detail with reference to the accompanying drawings, wherein.

Figure 1:
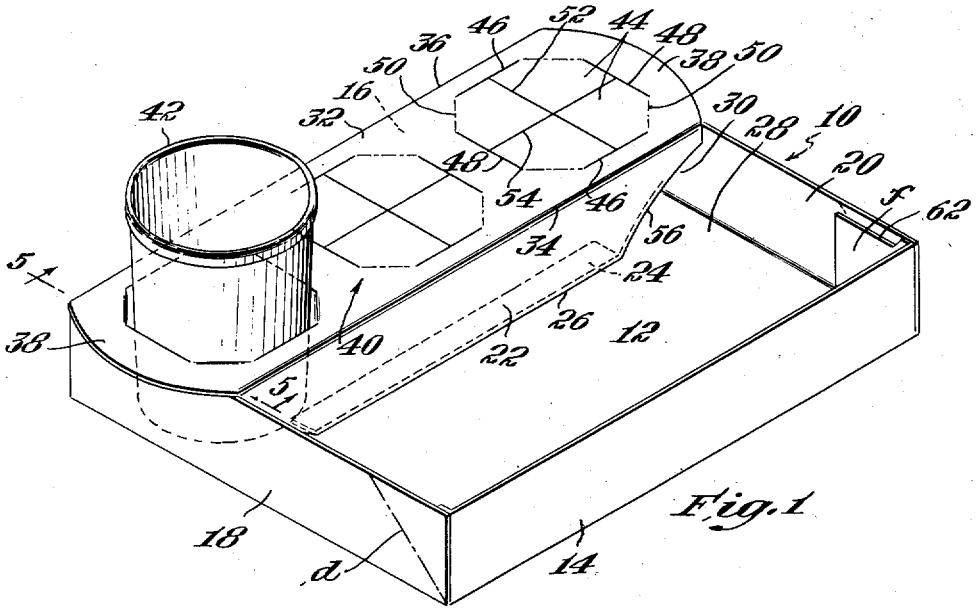
Fig. 1 is an isometric view of the carry-out tray set up to receive beverage receptacles and food.

Referring to the drawings, Fig. 1, the carry-out tray 10 has a bottom 12, front and rear side walls 14 and 16, respectively, and left and right end walls 18 and 20 respectively. The side and end walls rise substantially vertically from the bottom and, as illustrated herein form, with the bottom, a substantially rectangular open topped receptacle. Intermediate the front and rear side walls 14 and 16, and running parallel thereto and rising vertically from the bottom there is a partition wall 22, the lower edge of which is made fast to the bottom by an anchoring flange 24 connected thereto by a longitudinally extending hinge 26. The position of the partition wall 22, that is to say its distance from the rear wall 16, may be varied according to the size compartmentalization desired, and divides the tray into two compartments 28 and 30. A horizontal panel or cover 32 spans the compartment 30 forming a roof for the compartment, its longitudinal edges being connected respectively to the partition wall 22 and to the rear side wall 16 by hinges at 34 and 36. The opposite ends of the panel 32 have integral extensions 38 which overlap the upper edges of the end walls 18 and 20, resting thereon and providing support for the panel.

The panel 32 has in it one or more openings 40 each designed to receive a beverage container such as shown at 42. The opening 40 provides access, through the panel, to the chamber 30 into which the lower part of the container 42 may be pushed until its bottom rests on the bottom 12 of the tray. Arranged about the rim of each opening are one or more flaps 44 which are downwardly yieldable as the container is pushed down through the opening, these flaps forming resilient frictional members for engagement with the wall of the container. The flaps have two functions, namely, yieldably to hold the container after it is seated in the hole and to compensate for containers of different diameter so as to prevent a small container from sliding from side to side when carried and hence to prevent slopping or spilling of the liquid therein.

The openings 40 and the flaps 44 bordering the same are made by a series of cuts and score lines formed in the body of the panel material. According to one method, Fig. 1, two straight parallel cuts 46—46 are made longitudinally of the panel, parallel to the hinges 34 and 36 and at right angles to them, that is transversely of the panel; two additional straight cuts 48—48 are made which are spaced apart substantially the same distance as the cuts 46—46. The longitudinal and transverse cuts 46 and 48 do not intersect. However, connecting their terminal ends there are diagonal score lines 50. Additional cuts 52 and 54 intersect each other substantially at the geometrical center of the opening and at their ends intersect the longitudinal and transverse cuts 46 and 48 thus dividing the material within the area defined by the cuts 46 and 48 into four flaps 44, each of which is joined to the rim of the opening solely by a score line 50. As thus constructed the flaps 48 normally lie in the plane of the panel, but they may be deflected downwardly by pushing the bottom of the cup against them as it is thrust through the opening into contact with the bottom of the tray. The flexible and resilient nature of the flaps causes them to resist displacement so that after the receptacle is seated in place they bear against the side wall of the container, taking up any extra space which may exist by reason of the use of a container of smaller diameter than the opening and frictionally engaging its wall so as to resist sliding of the container or cup from side to side.

Figure 1A:
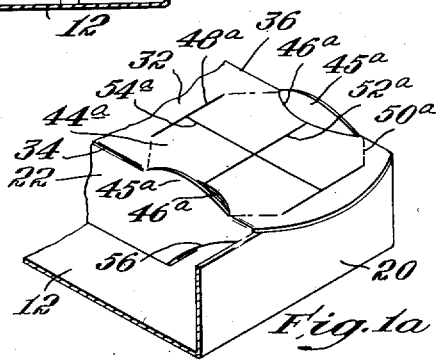
Fig. 1a is an isometric of a fragmentary portion of the tray at one end showing the panel in which are the openings for receiving the beverage containers, showing the preferred design for the opening.

While the manner in which the openings 40 are made in the panel for receiving the liquid containers, just described with reference to Fig. 1 is quite satisfactory, another and preferred manner of making the openings in the panel is shown in Fig. 1a. As therein illustrated the first two parallel cuts 46a—46a are inwardly convex and their ends intersect the hinges 34 and 36. The transverse cuts 48a—48a are straight, being identical with the cuts 48—48 shown in Fig. 1. The cuts 46a—46a and 48a—48a are non-intersecting and their adjacent ends are joined by score lines 50a. As in the first described structure cuts 52a and 54a are then made so as to intersect each other and the cuts 46a—46a and 48a—48a thereby to divide the material bounded by the cuts into flaps 44a which may be depressed about the score lines 50a. By constructing the openings in this manner segmental shaped projections 45a are left at the upper edges of the walls 16 and 22 which extend upwardly above the plane of the panel at the rims of the openings and afford additional support for the containers seated in the openings.

Figure 2:
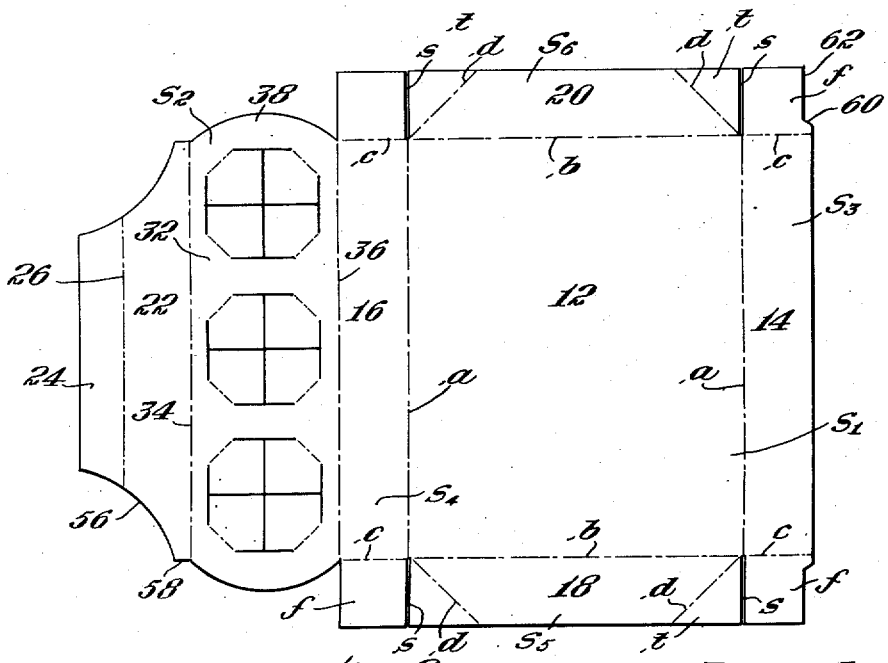
Fig. 2 is a plan view of the blank from which the tray illustrated in Fig. 1 is made.
Figure 3:
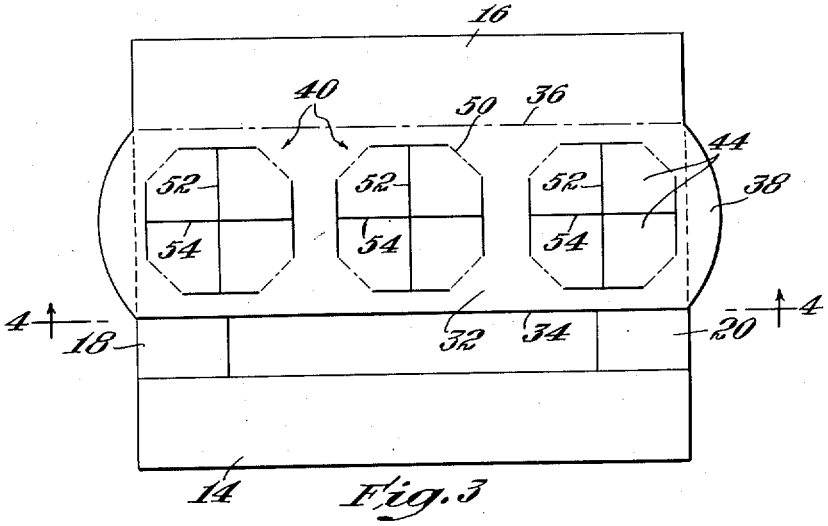
Fig. 3 is a plan view of the carry-out tray in its collapsed condition prior to setting up.
Figure 4:
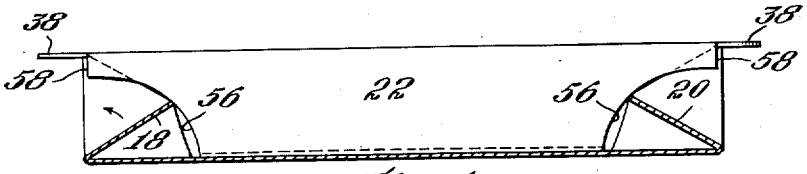
Fig. 4 is a longitudinal section taken on the line 4—4 of Fig. 3 showing the tray in a partially erected position.
Figure 5:
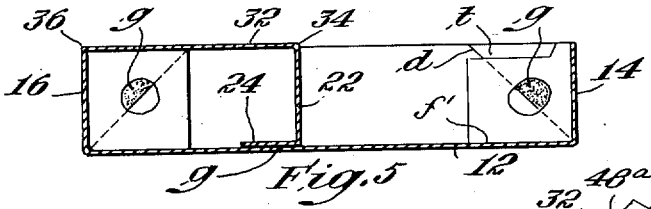
Fig. 5 is a transverse section taken on the line 5—5 of Fig. 1.
Figure 6:
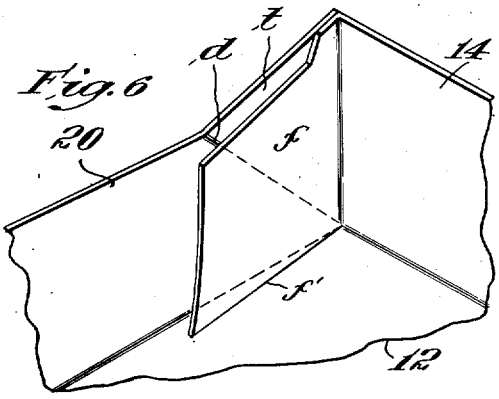
Fig. 6 is a fragmentary isometric, to larger scale, illustrating the construction at one of the corners and showing the self-locking feature.

The tray as thus constructed, either as in Fig. 1 or 1a is designed to be made from a single blank. These blanks may be died, one at a time successively, cut of a running sheet of suitable material or a plurality of blanks may be died simultaneously from superposed sheets of suitable size. The blank shown in Fig. 2 is cut to make up the tray shown in Fig. 1 and, as illustrated, has a substantially rectangular section S1 which constitutes the bottom 12 of the tray, a section S2 which constitutes the panel 32, and sub-sections S3, S4, S5 and S6 which constitute the side and end walls 14, 16, 18 and 20. The sub-sections S3 and S4 which constitute the front and rear side walls 14 and 16 are marked off from the section S1 by score lines a—a which form hinges at which the sides 14 and 16 may be folded with reference to the bottom 12. The sub-sections S5 and S6 which constitute the left and right end walls 18 and 20 are marked off from the section S1 by score lines b—b which form hinges at which the ends 18 and 20 may be folded with reference to the bottom 12. At the corners of the bottom section S1 there are anchoring flaps f, marked off from the sub-sections S3 and S4 by score lines c which provide hinges. The flaps f are separated from the sub-sections S5 and S6 by cuts or slots S, and thus the flaps f may be folded on the score lines c. The longitudinal edges of the flaps f, at opposite ends of the sub-section S3 are preferably notched by cutting away the material of the flaps along the lines 60 and 62 so as to remove small sections of the material along these edges. The sub-section S2 which forms the panel 32 is joined to the sub-section S4 along a score line which forms the hinge 36. The partition wall 22, in turn, is joined to the sub-section S2 by a score line forming the hinge 34, and the anchoring flange 24 is joined to the partition wall 22 by a score line forming the hinge 26. The partition wall 22 has, near its ends, curved edges 56 which are concave and also square shoulders 58.

The blank for making up the tray shown in Fig. 1a is identical in all respects with that just described with the one exception that the cuts 46a—46a are made curved rather than straight; hence it is not necessary to describe in detail the construction of a blank for making the tray shown in Fig. 1a.

The blank shown in Fig. 2, is preferably folded as follows after its parts have been united as above described. The end walls 18 and 20 are first folded inwardly on the score line b—b so as to lie flat against the bottom and then their end portions t as defined by the score line d which are substantially triangular are folded back on themselves. Following this, adhesive is applied to the triangular portions t whereupon the flaps f are folded inwardly on the lines c to engage the portions t. The panel 32 is folded on the line 36, the partition wall 22 is folded on the line 34 and the flange 24 is folded on the line 26 and adhesive is applied to the flange 24. The rear side wall 16 is now folded inwardly on the line a and the adhesive-coated side of the flange 24 is pressed against the bottom 12 and the parts are then held until the adhesive sets. The side walls 14 and 16 are now folded inwardly on the line a—a and the parts are held in this condition while the adhesive is setting. The blanks thus folded and secured may be shipped flat and are ready for subsequent use by a simple setting up operation.

When it is desirable to set the folded blank up into tray form as illustrated in Fig. 1, the side walls 18 and 20 are grasped and pulled upwardly so as to be perpendicular to the bottom. As the side walls are erected, the upper edges of the side walls may engage the concave edges 56 of the intermediate or partition wall 22 and assist, by a sort of cam action, in moving the wall 22 to a vertical position while the latter swings upwardly about the hinge 26. As the left and right end walls 18 and 20 reach their vertical positions they are then pulled outwardly slightly beyond the vertical so that the shoulders 58 snap downwardly against the inner surfaces of the end walls 18 and 20 near the top and the segmental potrions 38 rest flush on the upper edges of the end walls 18 and 20. At the same time the flaps f are moved to the right and left away from the end portions of the walls 14 and 16 and each of the triangular portions straightens out so as to be substantially in a plane with the end walls 18 or 20 respectively. Since the lower corner portions of the flaps f are not directly attached to the end walls they tend to stand out from the inner surfaces of the end walls a small amount, their lower edges f′ bearing on the bottom and resisting buckling of the end walls at the diagonals d which form the hinges. This provides an automatic lock for the corners of the box which together with the positive locking of the shoulders against the inside of the end walls produces a very rigid substantially non-collapsible structure.

It is apparent that the food compartment may be made as large or small as desired without affecting or changing the construction of the beverage compartment since the bottom 12, end walls 18 and 20 and side wall 14 may be extended laterally as much as is necessary without modifying the other end of the blank.

The important advantages are the non-collapsible nature of the tray, the self-locking corners, the stiffness and rigidity, the adaptability to beverage receptacles of various size and its susceptibility to increasing its food capacity without affecting the design or formation of the beverage compartment.

It should be understood that the present disclosure is for the purpose of illustration only and that this invention includes all modifications and equivalents which fall within the scope of the appended claims.

I claim:

1. A compartmentalized serving tray comprising a receptable having a bottom and side and end walls rising vertically therefrom, a partition wall rising from the bottom intermediate and parallel to one pair of the parallel walls dividing the receptacle into two compartments, a panel spanning one of the compartments, said panel being fast along its opposite edges to the upper edges of the partition wall and of the wall opposite it, respectively said panel having one or more openings therein, each opening being constituted by a series of cuts through and scorings of the substance of the panel, there being spaced, inwardly curved cuts, the ends of which intersect the junctions of the longitudinal edges of the panel with the partition wall and the wall opposite it, straight cuts running transversely of the panel and having substantially the same spacing as the curved cuts, said curved and transverse cuts being non-intersecting, diagonal score lines joining the adjacent ends of the non-intersecting cuts, and cuts extending through the geometrical center of the opening intersecting, at their ends, the curved and transverse cuts, respectively and which divide the substance of the panel, within the cuts into independent flaps hinged to the rim of the opening by the scored portions of the panel, the portion of the material of the panel, bounded by the inwardly curved cuts and the walls which said curved cuts intersect, forming vertical projections rising from the plane of the panel in the planes of these walls.

2. A substantially rectangular container having a bottom and side and end walls, the ends of the side walls being directly connected to the ends of the end walls and each pair of walls having, near their ends, hinges permitting collapse of one pair of walls onto the bottom and collapse of the other piar of walls onto the first pair of walls, a partition wall hingedly connected to the bottom parallel to one pair of said walls, said partition wall having its ends spaced from the adjacent walls at the points where they are secured to the bottom, a panel spanning the compartment defined by the partition wall, one of the walls parallel thereto and the walls which extend at right angles to the partition, said panel being hinged at its opposite longitudinal edges to the partition wall and to one of the walls parallel to the latter, respectively and the partition wall and panel being collapsible together with the side and end walls.

3. A substantially rectangular container according to claim 2, wherein the panel, the partition wall and the side wall which is parallel to the partition wall and the end walls define a cup-receiving chamber, and the association between the partition wall and the end walls of the container, at opposite sides of the latter, cooperates to form a lock to prevent the collapse of said container after the latter has been erected to operative position.

4. A substantially rectangular container according to claim 2, wherein the panel has an opening therein, resilient means attached to the rim of the opening, said resilient means being downwardly deflectable upon inserting a cup into the opening and in their downwardly deflected position frictionally resisting movement of the cup, and projections rising from the plane of the panel at diametrically opposed points of the rim of the opening for embracing a portion of the wall of the cup above the plane of the panel thereby to steady the cup.

5. A substantially rectangular container according to claim 2, wherein the partition wall has, near its ends, inclined edges which overlie the side walls when the latter are collapsed, and which are engaged by the upper edges of the end walls as the latter are raised to vertical position, the engagement of the edges of the end walls with said inclined edges being operative to raise the partition wall to a vertical position.

6. A substantially rectangular container according to claim 2, wherein the lower edge of the partition wall has at its ends concave edges which overlie the upper edges of the end walls when the latter are collapsed and which are engaged by the upper edges of the end walls as the latter are raised to vertical position, thereby automatically raising the panel to a vertical position.

7. A substantially rectangular container according to claim 2, wherein the partition wall has at its opposite extremities, shoulders arranged to abut the inner surfaces of the respective end walls when the latter are in erected position.

8. A serving container of the type which is delivered to the user in a fully collapsed condition for erection at time of using, said container being fabricated from a single blank and comprising a rectangular bottom wall, front and rear side walls and duplicate end walls, the side and end walls being hingedly secured to the front, rear and side edges of the bottom wall, a panel integral with and hinged to the upper edge of the rear side wall and extending forwardly therefrom, a partition wall, one edge of which is hinged to the forward edge of the panel, and an attaching flap hinged to the opposite edge of the partition wall, the panel spanning the space between the upper edges of the rear and partition walls and overlying portions of the upper edges of the end walls, means permanently interconnecting the opposite ends of each of said end walls to the opposite ends of the front and rear walls respectively, means permanently securing said attaching flap to the bottom wall, the opposite ends of each side wall having fold lines permitting the collapsing of the container by folding the end walls downwardly into substantial parallelism with the bottom wall and with the front and rear walls folded downwardly into substantial parallelism with the end walls and with the panel in the plane of the rear wall and overlying the partition and bottom walls, said end walls, when shifted upwardly from collapsed condition to upstanding condition where they are substantially perpendicular to the bottom wall, automatically elevating the front and rear walls and the partition wall, the panel then being in spaced parallelism with the bottom wall and spanning the space between the rear and forward walls and overlying portions of the upper edges of the end walls.

9. A serving container of the construction defined in claim 8, and wherein the length of the panel exceeds the transverse width of the bottom wall, and wherein panels of right triangular shape are provided at opposite ends of each end wall, one leg of each triangular panel being defined by the edge of an end wall, the other leg being defined by the outer side edge of said end wall, and the hypotenuse being a fold line in the end wall, said triangular panels being foldable outwardly onto adjacent portions of their respective end walls, thereby to permit collapsing the container in response to the folding of the end walls inwardly and downwardly onto and into substantial parallelism with the bottom wall and with the front and rear walls in overlapping parallelism with the triangular panels and the respective adjacent end walls and with the panel in the plane of the rear wall and overlying the partition and bottom walls and the rear portions of the end walls, and locking means, connected to said triangular panels, engageable with the bottom wall when the end walls have been shifted to upstanding position for precluding accidental or unintentional collapse of the container when it has been fully erected.

10. A serving container of the construction defined in claim 8, and wherein opposite ends of the forward wall of the panel are cut away to provide openings for the accommodation of the end walls as the latter are folded in collapsing the container.

11. In a serving container of the kind wherein front and rear side walls and left and right end walls are hinged to the edges of a rectangular bottom wall, and wherein the front and rear side walls are so connected at their ends to the corresponding ends, respectively, of the left and right end walls that the front and rear side walls and the left and right end walls may be folded down against the bottom wall, the connections between the ends of the front and rear side walls and the left and right end walls being so constructed and arranged that when the side and end walls are disposed perpendicularly to the bottom wall they tend to remain in upright position, in combination, a panel hinged along one edge to the upper edge of the rear side wall, a partition wall hinged along one edge to the opposite edge of the panel and an attaching flap hinged to the other edge of the partition wall, the flap extending rearwardly from its junction with the partition wall and being permanently attached to the bottom wall, the partition wall having recesses at its opposite ends to accommodate the right and left end walls, respectively, when the latter are folded downwardly, the partition wall comprising shoulder portions, above said recesses, engageable with the inner surfaces of the right and left end walls, respectively, when the latter are in upright position thereby positively to hold said walls upright, the panel extending outwardly beyond the right and left end walls when the latter are in upright position and having an aperture between its ends for the reception of a container.

*12. A substantially rectangular container having a bottom and side and end walls, the ends of one of said side walls being directly connected to the ends of the end walls, hinges being formed adjacent the connections permitting collapse of said walls, a partition wall hingedly connected to the bottom parallel to said side walls, said partition wall having its ends spaced from the adjacent end walls at the points where they are secured to the bottom by an amount not substantially greater than the height of said end walls, and having near its ends inclined edges which overlie the end walls when the latter are*

*collapsed, and which are engaged substantially throughout their lengths by the upper edges of said end walls as the latter are raised to vertical position, the engagement of the edges of the end walls with said inclined edges being operative to raise the partition wall to a vertical position, and a panel spanning the compartment defined by the partition wall, the other of said side walls parallel thereto and portions of said end walls, said panel being hinged at its opposite longitudinal edges to said partition wall and to one or said side walls, respectively, and the partition wall and panel being collapsible together with said side and end walls.*

*13. A container as defined in claim 12 wherein said inclined edges are concave.*

*14. A container as defined in claim 12 wherein said partition wall has at its opposite extremities shoulders arranged to abut the inner surfaces of the respective end walls when the latter are in erected position.*

References Cited in the file of this patent or the original patent

UNITED STATES PATENTS

| | | |
|---|---|---|
| 1,174,005 | Harr | Feb. 29, 1916 |
| 2,170,723 | Marx | Aug. 22, 1939 |
| 2,294,641 | Walters | Sept. 1, 1942 |
| 2,512,963 | Peiker | June 27, 1950 |
| 2,525,125 | Goodyear | Oct. 20, 1950 |
| 2,565,288 | Worfford | Aug. 21, 1951 |